United States Patent Office 3,496,782
Patented Feb. 24, 1970

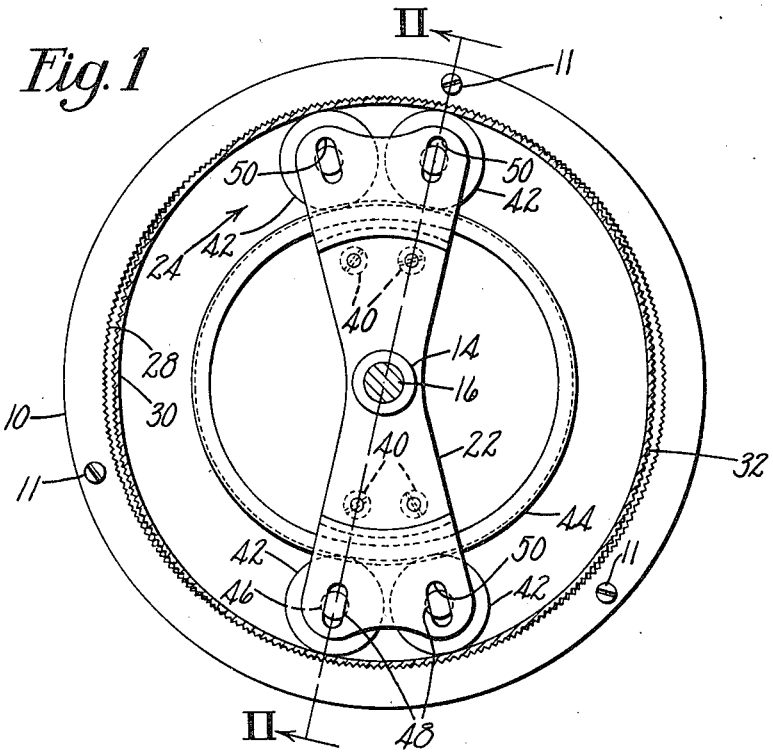
Fig. 1
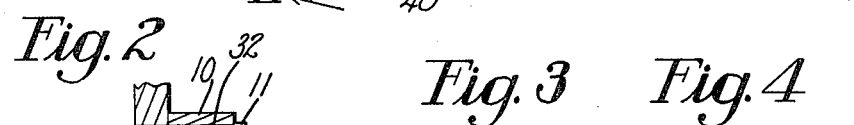
Fig. 2    Fig. 3    Fig. 4
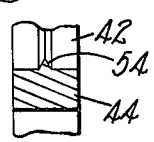
Fig. 5
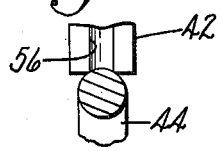
Inventors
John H. Carlson
Hugh A. Robinson
By their Attorney
Carl E. Johnson.

3,496,782
ACTUATORS EMPLOYING PRELOADED WAVE GENERATORS
John H. Carlson and Hugh A. Robinson, Wenham, Mass., assignors to USM Corporation, Flemington, N.J., a corporation of New Jersey
Filed July 29, 1968, Ser. No. 748,503
Int. Cl. F16k *35/18*
U.S. Cl. 74—10.8      7 Claims

ABSTRACT OF THE DISCLOSURE

A mechanism for imparting an elliptoidal shape to a flexspline of a harmonic drive type transmission and for rotating this shape to effect improved meshing of the flexspline and a cooperating circular spline. The mechanism includes a rotary spider carrying diametrically opposed flexspline engaging rollers which are backed up by a concentric deflectable ring.

BACKGROUND OF THE INVENTION

A harmonic drive rotary transmission, in which this invention is especially useful, though not necessarily limited to gearing, utilizes a circumferential wave of radial deflection for converting mechanical motion. As disclosed for instance in U.S. Letters Patent 2,906,143, granted Sept. 29, 1959 on an application filed in the name of C. Walton Musser, a mechanical drive of this type generally includes in different coaxial arrangements three basic elements: (1) a circular spline which often serves as the reaction member, (2) a flexspline deflected into lobar, commonly elliptoidal, shape for meshing at spaced circumferential localities with the circular spline, and (3) a wave generator, with which the present invention is particularly concerned, for effecting the shape of the flexspline and progressing this shape rotationally. Wave generators are used in various forms and, as described in the cited patent, may be internal to deflect the flexspline outwardly or disposed externally to deflect the flexspline inwardly.

An outstanding feature of harmonic drive transmission is its large torque carrying capability for its size, a characteristic which is enhanced, as disclosed in U.S. Letters Patent No. 2,930,254, issued Mar. 29, 1960, by changing wave generator contour to increase the multiple tooth contact area of teeth in mating engagement. Also it has hitherto been proposed, as disclosed in U.S. Letters Patent 2,983,162, to reduce backlash between the meshing gears by increasing wave generator deflection, and thus causing the spline teeth in the areas of engagement to become preloaded.

SUMMARY OF THE INVENTION

The present invention, valuable particularly for precision drives, provides an improved wave generator construction whereby substantial preloading forces can be applied to attain both zero backlash and extended tooth contact without adversely affecting input torque, the loads advantageously being reacted by rolling elements. The latter preferably are freely rotatable, as herein shown, on their respective mounting pins carried by a rotating spider, each of the rolling elements being engaged on one side by a preloading ring (i.e. radially deflected) serving to urge the opposite side of the element into rolling deflecting engagement with the flexspline.

It is a further general object of the invention to provide an improved harmonic drive type actuator whereby nearly zero backlash is attainable in either direction of operation to provide refined angular positioning.

BRIEF DESCRIPTION OF THE DRAWINGS

The above and other features of the invention will now be more fully described in connection with an illustrative embodiment, and with reference to the accompanying drawings thereof, in which:

FIG. 1 is a view in front elevation of an illustrative fine tuning mechanism embodying the invention, an input shaft being shown in section and parts removed for clarity;

FIG. 2 is a section taken on the line II—II of FIG. 1 and showing the tuner as mounted on a wall or panel; and FIGS. 3–5 inclusive are enlarged detail views illustrating alternative formations of the perimeter of the preloaded ring shown in FIGS. 1 and 2.

DESCRIPTION OF THE PREFERRED EMBODIMENT

The invention will now be described as applied to one form of harmonic drive speed reducer as adapted for manual tuning or angular positioning, it being understood that the invention is not thus limited.

A circular spline 10 is secured by screws 11 to a wall or panel 12 which has been coaxially bored to receive a bearing bushing 14. Rotatably extending through this bushing is an input shaft 16, to the outboard end of which a control knob 18 (FIG. 2) is affixed as by a set screw 20. Secured to a mid portion of the shaft 16 for rotation therewith is the hub of a flat carrier portion 22 of a composite novel wave generator generally designated 24 and hereinafter more particularly described. For axially retaining the bushing 14 a nut 26 is threaded on its unflanged end.

For meshing with internal spline teeth 28 on the circular spline 10 at circumferentially spaced localities, in this case at the major axis, a tubular flexspline 30 is formed with external spline teeth 32. The latter differ in number from the circular spline teeth 28 in this instance by two or a multiple thereof. The flexspline 30 is to serve as an output. The hub 31 is accordingly shown in FIG. 2 having a rotatable bearing on the inboard end of the shaft 16 and is integral with (or may be fixed to) an output shaft 34 which is to be angularly positioned with precision. For retaining the flexspline 30 axially, matching circumferential grooves in the shaft 16 and the flexspline hub receive a snap ring 36 (FIG. 2).

The wave generator 24 comprises, in addition to the flat portion 22, a complemental spider or carrier portion 38 affixed thereto by means of screws 40, diametrically opposed pairs of rollers 42, 42 engageable with the flexspline opposite to its spline teeth 32, and a preloaded elliptoidal wave generator ring 44 for resiliently backing the four rollers 42 and urging them radially outward to effect progressive meshing of the teeth 28, 32. To this end the rollers 42 respectively have axles 46 formed with diametrically opposed flats 48 slidably receivable in radially extending guide slots 50 aligned in the outer margins of the carrier portions 22, 38. The slots 50 of each pair are spaced apart sufficiently to allow clearance between the rollers of each pair.

In the arrangement shown, the minor axis of the preloaded ring 44 is substantially coincident with the induced major axis of the flexspline 30 and with a plane containing the axes of the shafts 16, 34 and extending between the centers of the pairs of the rollers 42, 42. Advantageously not only is there extended flexspline tooth contact produced in the arcs extending between adjacent localities of roller contact with the flexspline, but the preloading forces imposed on the flexspline by the ring 44 can be substantial without adversely affecting the input torque because loads are taken through the rollers 42 and are not reflected on the carrier axles where torque is transmitted. It will be understood that in lieu of opposed pairs of rollers 42, single or triple rollers may be employed though pairs are usually preferred for their centralizing effect on the ring 44. It will also be appreciated that the rollers as well as the ring 44 may be resilient, and that if a ring 44 were non-resilient, it would be particularly desirable to have resilience in the rollers 42.

Though not illustrated herein, it will be understood that in an arrangement where a flexspline is external to a circular spline, deflection radially inward would be effected by a preloaded wave generator ring 44 and rollers 42 operating externally of the flexspline.

The rim of the ring 44 for deflecting the rollers 42 outwardly may optionally have a shallow recess 52 as shown in FIG. 3 for providing a track for the rollers 42, or the rim may have a V projection 54 (FIG. 4) mating in an annular notch in the rolls, or the preloaded ring 44 may be circular in section as shown in FIG. 5 and be retained in a circumferential groove 56 in the respective rollers 42. In rotating the knob 18 to angularly adjust the shaft 34, the carrier 22, 38 applies force to the flats 48 of the axles of the rollers 42 thus effecting their rotation and circumferential movement over the rim of the ring 44. Hence, by reason of the resilience of the preloaded ring 44 the rollers are simultaneously urged outward, each to the same degree, to insure meshing of the flexspline teeth 32 with the circular spline teeth 28 over an extended arc in the locality of the flexspline major axis, and with substantially zero backlash. Advantageously, the use of opposed pairs of rollers 42 has a centralizing effect tending to maintain the same shape in the ring 44.

It will be apparent from the foregoing that our novel wave generator affords large areas of tooth contact between the flexspline and circular spline, that these members experience substantially zero backlash regardless of the direction of angular adjustment by means of the knob 18, and that the control unit insures precision operation at low cost.

Having thus described my invention, what we claim as new and desire to secure by Letters Patent of the United States is:

1. In a harmonic drive actuator including a circular spline and a flexspline for meshing therewith at spaced circumferential localities, a wave generator coaxial therewith comprising a relatively rotatable carrier, diametrically opposed rollers mounted in the carrier for yielding engagement with the flexspline to urge its teeth into progressive relation with the circular spline teeth, and a preloaded ring circumferentially engageable with said rollers at localities diametrically opposite to their points of engagement wth the flexspline, at least one of the ring and said rollers being resilient radially.

2. An actuator as set forth in claim 1 wherein the rollers are arranged in pairs.

3. An actuator as set forth in claim 1 wherein the wave generator carrier is mounted for input rotation and is formed with bearing means for providing for limited radial movement of the individual rollers.

4. An actuator as set forth in claim 1 wherein the wave generator carrier is formed with radial slots, and the rollers are mounted on axles having flats respectively slidably received in said slots.

5. An actuator as set forth in claim 1 wherein the wave generator carrier is formed to straddle said preloaded ring, and the latter has a rim formation adapted to accommodate the periphery of said rollers.

6. A control knob assembly comprising a stationary circular spline, a coaxial output flexspline meshing therewith at spaced circumferential points, and input means including a control knob, acoaxial shaft affixed at one end to the knob and rotatably supporting the flexspline at its other end, and a composite wave generator co-rotatable with the input shaft, said wave generator comprising a carrier having rolling elements engageable with the flexspline adjacent to said spaced circumferential points, and a preloaded elliptoidal ring bearing on said rolling elements to urge the spline teeth of the flexspline and the circular spline into engagement, one of the ring and said rolling elements being radially yieldable.

7. A control knob assembly as set forth in claim 6 wherein the rolling elements are diametrically opposite pairs of rollers, the carrier being adapted to limit radial movement of the rollers.

References Cited

UNITED STATES PATENTS

| | | | |
|---|---|---|---|
| 3,196,713 | 7/1965 | Robinson | 74—640 |
| 3,435,706 | 4/1969 | Humphreys | 74—640 |
| 3,447,385 | 6/1969 | Humphreys | 74—10.8 X |

MILTON KAUFMAN, Primary Examiner

U.S. Cl. X.R.

74—10.52, 640